Saladee & Hall.
Making Hoes.
N°. 78,611.  Patented Jun. 2, 1868.
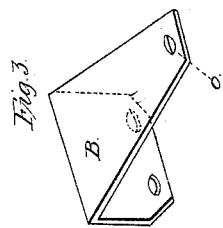
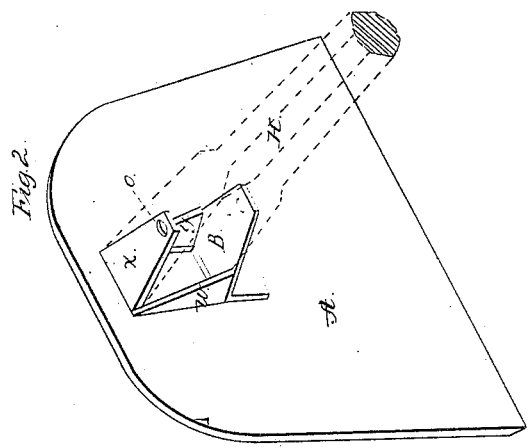
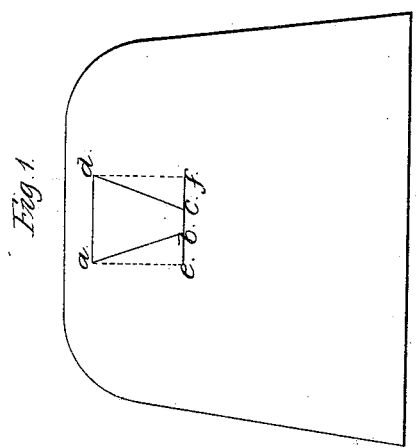
Witnesses.  Inventor.

United States Patent Office.

CYRUS W. SALADEE, OF NEWARK, OHIO, AND JOHN S. HALL, OF PITTSBURG, PENNSYLVANIA.

Letters Patent No. 78,611, dated June 2, 1868.

IMPROVEMENT IN HOES.

The Schedule referred to in these Letters Patent and making part of the same.

TO ALL WHOM IT MAY CONCERN:

Be it known that we, CYRUS W. SALADEE, of Newark, Ohio, and JOHN S. HALL, of Pittsburg, Pennsylvania, have invented certain new and useful Improvements in the Construction of Hoes; and we do hereby declare that the following is a full, clear, and exact description, reference being had to the accompanying drawings, and to the letters of reference thereon marked. In the drawings—

Figure 1 is a plan of the blank hoe.

Figure 2 is the hoe complete, with handle attached.

Figure 3 shows the "brace" or extra lip.

Our invention consists in an improved mode of manufacturing hoes, more fully hereinafter described.

In making a hoe according to our invention, we take a hoe-blade, A, of sheet steel or iron, and with the aid of one or more dies or chisels, cut through it the three lines, $a\ b$, $c\ d$, and $e\ f$, as shown in fig. 1, these lines being cut at the proper place for the handle to be inserted.

A mandrel, of suitable size and shape, corresponding to the size and shape of the handle to be used, is then forced or struck up from the under side of the blade, so as to throw up and form the three lips, $w$, $x$, and $y$, as shown in fig. 2. The upper lip, $x$, is as long as the length of the opening made in the hoe, while the opposite lips, $w$ and $y$, are quite narrow.

We then form of cast or stamped metal, an angle-brace, B, nearly corresponding in size and shape to the long lip $x$. This brace B is fastened by a rivet to the blade A, up against the heels of the lip-braces $w$ and $y$, and opposite to the long lip $x$.

The square-ended handle, H, is then inserted, and secured by a bolt, passing through holes $o$, in lip $x$ and brace B.

By this mode, we are enabled to produce hoes as cheap and strong as by any known mode.

Having fully described our invention, what we claim as new, and desire to secure by Letters Patent, is—

The lips $w$, $x$, and $y$, when formed substantially as described, as part of the hoe-blade, in combination with the brace B, substantially as and for the purposes set forth.

In testimony that we claim the above, we hereunto set our names.

CYRUS W. SALADEE,
JOHN S. HALL.

Witnesses:
H. McCUNE,
J. K. SPEER.